Jan. 7, 1969   J. L. EVANS   3,420,111
FLUID REGULATOR
Filed June 22, 1965
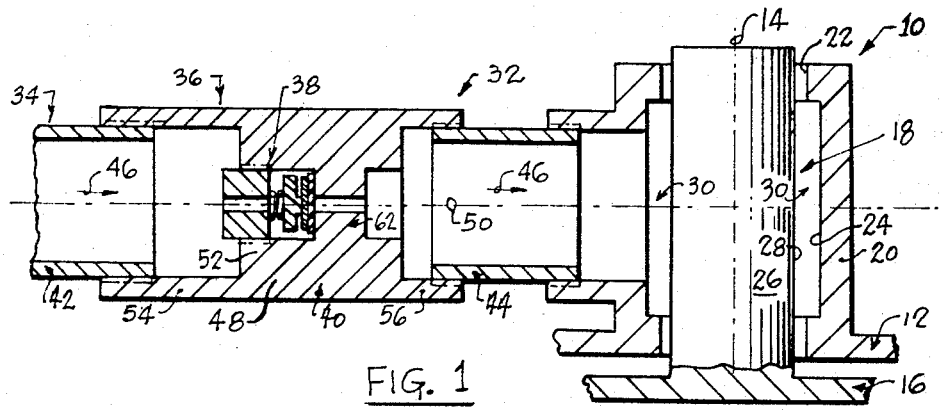
FIG. 1
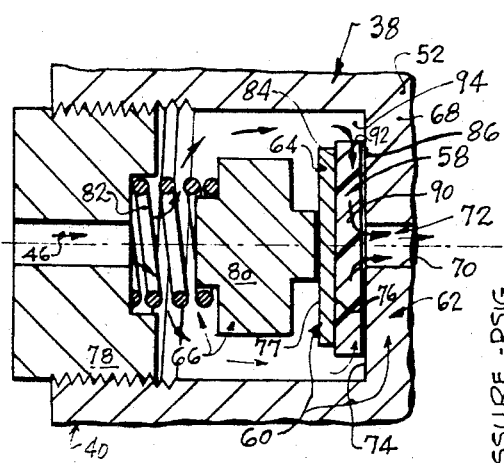
FIG. 2
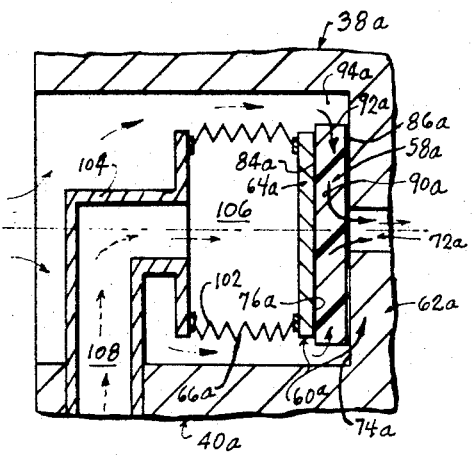
FIG. 5
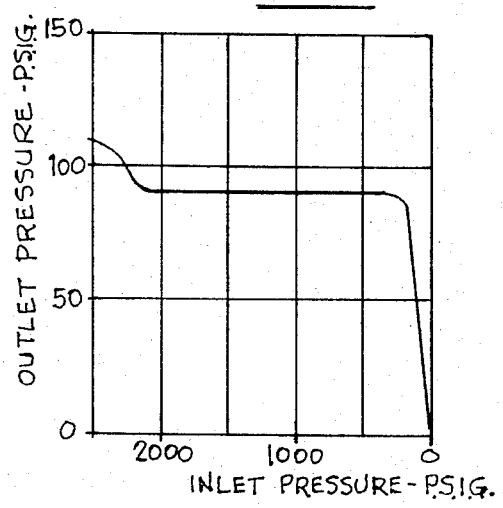
FIG. 3
FIG. 4
JOHN L. EVANS
INVENTOR.
BY
Thomas W. Kennedy
ATTORNEY.

United States Patent Office 3,420,111
Patented Jan. 7, 1969

3,420,111
FLUID REGULATOR
John L. Evans, Oakland, N.J., assignor to General
Precision System Inc., a corporation of Delaware
Filed June 22, 1965, Ser. No. 465,993
U.S. Cl. 74—5.7        14 Claims
Int. Cl. G01c *19/06*

ABSTRACT OF THE DISCLOSURE

A constant flow regulator includes a chamber with inlet and outlet apertures and means for regulating communication between the chamber and the outlet aperture in accordance with the chamber pressure. The regulation is achieved by a pair of thin discoid members, one being a porous member immediately over the outlet aperture and the other being a flat plate in juxtaposition with the porous member but on the side of it remote from the outlet aperture. Pressure within the chamber bears against the plate member and causes it to both deflect the plate and to compress the porous member to restrict the opening between chamber and outlet. Since the deformation of the plate is a function of pressure, the response of the plate is to regulate the flow from the chamber.

---

The present invention relates to fluid regulators, and particularly to a small-size gas-pressure regulator.

A prior art gas-pressure regulator is comprised of a housing with a cavity and a diaphragm enclosed therein. The diaphragm divides the cavity into two chambers. One chamber has a single supply connection for providing gas to the chamber at a fixed pressure. The other chamber has an outlet connection and has an inlet port for flow therethrough. The inlet port receives a conical plug, which is displaceable relative thereto for varying the opening size. The plug has a shaft connecting to the diaphragm so that the differential pressure across the diaphragm between the two chambers controls the inlet opening size. In this way, the outlet flow rate and outlet gas pressure are maintained substantially constant.

One problem with the prior-art regulator is the difficulty in designing a small-size fast-response pressure regulator suitable for miniature gas systems. Another problem with the prior-art regulator is the difficulty in minimizing error-inducing static friction between the plug and its port.

In accordance with one embodiment of the present invention, a frictionless, small-size, fast-response gas-pressure regulator is provided by using a porous resilient filter sandwiched between a pair of clamp portions, which are fitted in the gas line. The filter has capillary conduits through which the gas flows. The clamp applies a pressure, which is provided by the differential pressure across the filter. The clamp squeezes the filter in a direction transverse to the filter conduits thereby varying the gas flow therethrough according to said differential pressure. In this way, the outlet flow rate and outlet pressure in the line are held substantially constant.

Accordingly, it is one object of the invention to provide a frictionless, fast-response flow regulator for a fluid system.

It is another object of the invention to provide a sensitive, small-size gas-pressure regulator for a miniature fluid system.

It is a further object of the invention to provide a gas-pressure regulator with no moving parts.

It is a still further object of the invention to provide a gas-pressure regulator, which is substantially insensitive to high-G acceleration forces.

To the fulfillment of these and other objects, the invention provides a pressure regulator comprising a porous resilient body and a clamp means. The porous body is disposed in a passage means carrying fluid under pressure. The porous body is disposed between the upstream end of the passage means which has a variable fluid pressure and the downstream end of the passage means. The clamp means is supported by the passage means and has portions disposed on opposite sides of the resilient body. The clamp means compresses the resilient body with a force proportional to the upstream pressure, said force being directed transversely to the direction of flow through the resilient body. With such a regulator, a substantially-constant downstream fluid pressure and a substantially-constant flow rate are provided in the downstream end of the passage.

Other objects of the invention will become apparent upon reading the annexed detailed description in connection with the drawings wherein like parts are designated by like numerals throughout the several views, and wherein:

FIG. 1 is a sectional view of a gyro gas-bearing system embodying features of the present invention;

FIG. 2 is an enlarged portion of FIG. 1;

FIG. 3 is an enlarged portion of FIG. 2;

FIG. 4 is a curve of inlet pressure vs. outlet pressure; and

FIG. 5 is a sectional view of a regulator illustrating a modification of the present invention.

Referring to FIG. 1, one embodiment of the present invention, which is a gyro 10, comprises an outer gimbal 12 with a gimbal axis 14; an inner gimbal 16 coaxial therewith, which is pivotable relative to outer gimbal 12 about axis 14; and a gas-bearing pivot system 1 coaxial therewith, which interconnects outer gimbal 12 to inner gimbal 16 for minimizing frictional restraint therebetween.

Gas-bearing pivot system 18 includes a bearing sleeve 20 having a radially inner surface 22 with an annular gas-collecting recess 24. Pivot system 18 also includes a shaft 26, which is journaled in sleeve 20 and which has a radially outer surface 28 which overlaps recess 24 thereby forming an annular gas-bearing chamber 30 therebetween. Pivot system 18 also includes a gas supply means 32, which connects to sleeve 20 for supplying gas to chamber 30.

Gas supply means 32 has a variable pressure source 34, such as a gas bottle. Gas supply means 32 also has a passage means 36, which interconnects source 34 to chamber 30, and has a pressure regulator 38, which is supported by passage means 36 and which is disposed between source 34 and chamber 30 for assuring a constant pressure and constant flow to chamber 30.

Passage means 36 includes a pipe or casing 40 for supporting regulator 38, a pipe coupling 42, which interconnects source 38 to pipe 40 coaxially therewith. Passage means 36 also includes a pipe coupling 44, which interconnects pipe 40 to sleeve 20 coaxially therewith thereby permitting a continuous flow 46 from source 34 to chamber 30.

Pipe 40 has a peripheral wall 48 with a longitudinal axis 50. Wall 48 has a cylindrical intermediate wall portion or cylinder wall 52, which has a small inner diameter. Wall 48 also has a wall portion 54 on the upstream end thereof having a large inner diameter for connection to coupling 42, and also has a wall portion 56 on the downstream end thereof also having a large inner diameter for connection to coupling 44.

Regulator 38 has a porous resilient disk 58 and has a clamp means 60 coaxial with disk 58 along axis 50. Clamp 60 has a back-up ring 62, which is integrally connected to cylinder wall 52, and has a pressure plate or shuttle 64, which is coaxial therewith and axially displaceable relative thereto, and has a plate positioning means 66.

Ring 62, which is preferably composed of metal and which is shaped like a washer, has a radially outer portion 68, which is sealingly joined to cylinder wall 52 forming an end wall portion thereon. Ring 62 has a radially inner surface 70, which has a cylindrical shape of reduced diameter and which forms a necked-down bore or passage portion 72 for fluid flow therethrough. Ring 62 also has an axially outer side 74 which faces plate 64 and which abuts disk 58. Side 74 has a flat, polished surface to minimize leakage of fluid around disk 58.

Plate 64, which is also preferably composed of metal and which is preferably flat, has an axially inner side 76, which faces side 74 and is disposed parallel thereto and which also bears against disk 58, and also has an outer side 77.

Plate positioning means 66 includes a hollow set screw 78, which is threaded into cylinder wall 52 forming an end wall portion thereon. Plate positioning means 66 also includes a piston plug 80, which bears against plate 64 and also a spring means 82, which is disposed between screw 78 and plug 80 and which urges plug 80 against plate 64. Spring means 82 is designed to exert only a slight axial force sufficient to coaxially position plug 80, plate 64 and disk 58 during a shutdown condition. Positioning means 66 is only needed for a shutdown condition when the upstream fluid pressure is too low to urge plate 64 against disk 58. In FIG. 2 the respective axial thicknesses of disk 58, plate 64, plug 80 and spring 82 have been exaggerated for ease of illustration.

Disk 58, which is preferably a porous resilient filter body composed of cellulose ester material and which is preferably flat and circular in shape, has a pair of axially-spaced end faces 84, 86. Face 84 abuts side 76, and face 86 abuts the other side 74. Disk 58 is clamped or squeezed between ring 62 and plate 64, and is compressed by a varying compression pressure acting in an axial direction on side 77, that is caused by the high pressure gas adjacent thereto.

Disk 58 has capillary conduits 88 and has a fluid flow 90 running in a radial direction through conduits 88 parallel to faces 84, 86. Disk 58 has a radially outer edge 92, which is separated from cylinder wall 52 by an annular gap 94. Flow 90 through disk 58 enters from gap 94, travels in a radial direction and leaves through bore 72. Flow 90 has a high variable inlet pressure in gap 94, and has a low constant outlet pressure in bore 72.

FIG. 3 is an enlarged portion of FIG. 2, and illustrates in a schematic manner the microscopic structure of disk 58. For ease of illustration, the solid materials in disk 58 are spheres 96 with open spaces or interstices or pores 98 therebetween forming capillary conduits 88 therethrough running from edge 92 to center of disk 58. Pores 98 should have a pore size, which is preferably not greater than 0.004 inch; and said pore size should preferably not vary more than ±30% from a mean pore size thereby providing a very high spring rate in the disk 58.

One model of embodiment 10 has a disk 58 of 0.006 inch thickness and an outer diameter of 0.120 inch, a plate 64 of about 0.001 inch thickness with an outer diameter of about 0.120 inch, an annular gap 94 of about 0.002 inch thickness and a bore 72 of 0.020 inch inner diameter. With this construction, the path of flow 90 through disk 58 is about 0.050 inch in length with a cross-section having a 0.006 inch thickness. To obtain a suitable flow path size with such design of embodiment 10, bore 72 should preferably have an inner diameter between 10% and 35% of the outer diameter of disk 58. In addition, disk 58 should preferably have a thickness not greater than one-half the inner diameter of bore 72; and plate 64 preferably should have a thickness not greater than one-half the thickness of disk 58.

FIG. 4 is a typical curve of inlet pressure vs. outlet pressure, which is based on experimental data that was obtained in tests of the aforementioned test model of embodiment 10. In the test procedure, the inlet pressure was gradually lowered between a starting inlet pressure of 2600 p.s.i.g. to a finished inlet pressure of 0 p.s.i.g. in steps of 200 p.s.i.g. at two-minute intervals. The inlet pressure in coupling 42 and the corresponding outlet pressure in coupling 44 were measured in each two-minute interval. FIG. 4 illustrates that the outlet pressure is substantially constant, and is notably constant within the range between 2100 p.s.i.g. to 500 p.s.i.g. inlet pressure.

FIG. 5 is a schematic representation of a regulator 38a according to the invention. Regulator 38a is an alternate embodiment or modification of regulator 38. Parts of regulator 38a corresponding to similar parts of regulator 38 have the same numerals but with a subscript "a" added thereto. New parts of regulator 38a have new numerals.

Regulator 38a, which is used as a servo valve, comprises a pipe 40a, a disk 58a and a clamp 60a. Clamp 60a has a ring 62a, plate 64a and a positioning means 66a. Ring 62a has a bore 72a and an axially-outer side 74a. Plate 64a has an axially-inner side 76a.

Positioning means 66a includes an axially expansible bellows 102, which is sealingly joined to plate 64a at one end thereof. Positioning means 66a also includes an elbow 104 which is sealingly joined to the other end of bellows 102 thereby enclosing a bellows chamber 106. Elbow 104 has a secondary passage 108 which supplies chamber 106 with gas at a controlled pressure for compressing disk 58a.

Disk 58a has end faces 84a, 86a and has a radially-outer edge 92, which is separated from pipe 40a by an annular gap 94a. Disk 58a also has capillary conduits (not shown) and has a flow 90a running from inlet gap 94a to outlet bore 72a. Gap 94a has gas with a controlled pressure, which is separately sealed from chamber 106. Chamber 106 has gas at a controlling pressure. With this construction, the inlet upstream pressure in gap 94a and the outlet downstream pressure in bore 72a and the rate of flow 90a can be selectively controlled by the gas pressure in bellows chamber 106.

In summary, this invention provides a pressure regulator for use in a gyro having a constant-pressure gas-bearing gimbal system, in which the regulator is a miniature, constant-pressure and constant-flow type of regulator. In addition, the regulator has a small size, a high sensitivity, and a fast-response time. Moreover, the regulator has no mechanical moving parts whereby the regulator is not subject to friction and is substantially insensitive to high-G acceleration forces.

While the present invention has been described in a preferred embodiment, it will be obvious to those skilled in the art that various other modifications can be made therein within the scope of the invention. For example, positioning means 66 in regulator 38 can be eliminated by providing a minimum gas-flow pressure on disk 58 during a shutdown condition for those applications where it is desirable to still further minimize G-loading and acceleration forces on disk 58. It is intended that the appended claims cover all such modifications.

What is claimed is:

1. A pressure regulator for use in a passage means carrying fluid under pressure from an upstream end with a variable fluid pressure to a downstream end thereof comprising:

a porous resilient body disposed in the passage between its upstream end and its downstream end; and a clamp means supported by the passage means coaxially therewith having portions disposed on opposite sides of said resilient body for compressing said resilient body with a force proportional to the upstream pressure, said force being directed transversely to the direction of flow through said resilient body, whereby a substantially constant downstream fluid pressure and a substantially constant flow rate are provided on the downstream end of the passage means.

2. A regulator as claimed in claim 1, in which said resilient body has a pore size of a diameter not greater than 0.004 inch for forming capillary conduits therethrough.

3. A regulator as claimed in claim 2, in which said pore size does not vary more than +30% from a mean pore size.

4. A regulator as claimed in claim 2, in which said resilient body is composed of a cellulose ester material.

5. A regulator as claimed in claim 1, in which said passage means is a pipe with a longitudinal axis, in which said clamp means includes a washer-shaped coaxial back-up ring with a radially outer portion sealingly joined to said pipe and forming a necked-down passage portion therethrough and a flat pressure plate coaxially abutting said ring, and in which said porous body is a flat disk seated between said plate and said ring.

6. A regulator as claimed in claim 5, in which said clamp includes a spring means for positioning said plate and disk during a shutdown condition.

7. A regulator as claimed in claim 5, in which said back-up ring has an inner bore diameter with a dimension between 10% and 35% of the disk outer diameter.

8. A regulator as claimed in claim 5, in which said disk has a thickness not greater than one-half of said ring inner bore diameter.

9. A regulator as claimed in claim 5, in which said plate has a thickness not greater than one-half said disk thickness.

10. A regulator comprising:
a cylinder with a longitudinal axis having a peripheral wall and a pair of axially-spaced end walls forming a fluid cavity, said end walls respectively having an inlet passage and an outlet passage;
a shuttle disposed in said cavity coaxially therewith and displaceable relative to said cylinder; and
a resilient filter body seated between said shuttle and said outlet wall coaxially therewith and covering said outlet passage,
whereby the flow resistance level of said filter is approximately proportional to the pressure drop across said filter.

11. A gyro comprising:
a gimbal system including an outer body and an inner body journaled in the outer body and forming a chamber therebetween containing a substantially-constant-pressure gas film for support of said inner body by said outer body; and
a gas supply means for supplying said chamber including a variable-pressure supply source and a passage means interconnecting said source and said chamber having a regulator as claimed in claim 10.

12. A gyro comprising:
an outer gimbal with a gimbal axis;
an inner gimbal coaxially disposed therewith;
a gas bearing pivot system interconnecting said outer gimbal and said inner gimbal for pivoting of said inner gimbal relative to said outer gimbal about said axis;
said pivot system having a bearing sleeve with an annular recess and a shaft journaled in said sleeve forming an annular gas bearing chamber therebetween and a gas supply means connecting thereto and supplying said chamber;
said supply means having a variable-pressure source, a passage means interconnecting said source and said chamber and a pressure regulator connecting to said passage means;
said passage means including a pipe for supporting said regulator with a longitudinal axis, a coupling interconnecting said pipe to said source and another coupling interconnecting said pipe to said sleeve forming a continuous passage for flow from said source to said chamber;
said pressure regulator comprising a porous flat resilient disk and a clamp means;
said porous disk being composed of a cellulose ester material with a pore size not exceeding 0.004 inches forming capillary conduits therethrough;
said clamp means having a washer-shaped back-up ring with a radially-outer portion sealingly joined to said regulator pipe forming a necked-down passage portion therethrough, and a flat pressure plate coaxially disposed alongside said ring;
said porous disk being sealed between said plate and said ring coaxially therewith for axial compression transverse to its flow conduits,
whereby flow resistance through said disk is proportional to the pressure head across said disk so that flow and downstream pressure remain substantially constant.

13. A constant-volume gas-flow regulator comprising:
wall means defining a chamber having an inlet bore and an outlet bore;
means including a plate member spaced from said outlet bore and being movable with respect to said outlet bore along an axis, said plate member having an adjacent surface being projectable along said axis onto a wall of said chamber to cover said outlet bore, said plate member being axially movable and deforming in response to pressure in said chamber to vary the spacing between said plate member and the wall portion of said chamber having said outlet bore to control the effective flow area between said chamber and said outlet bore.

14. A constant-volume gas-flow regulator according to claim 13, wherein said pressure-responsive means further includes a second member in superposed relation with said first mentioned member over said outlet bore, one of said members being apertured to permit gas flow therethrough, and means to maintain the relation and disposition of said members.

References Cited

UNITED STATES PATENTS

| | | | |
|---|---|---|---|
| 2,042,462 | 6/1936 | Hahn | 138—43 |
| 2,304,689 | 12/1942 | Hanson | 138—46 |
| 2,327,195 | 8/1943 | Kosky et al. | 138—43 |
| 2,593,372 | 4/1952 | Watts | 138—43 |
| 2,813,541 | 11/1957 | Beller | 137—504 |
| 2,857,927 | 10/1958 | Pardee | 138—43 |

C. J. HUSAR, *Primary Examiner.*